O. E. MAYNARD.
DRAWING GLASS.
APPLICATION FILED DEC. 29, 1911.
1,120,512.
Patented Dec. 8, 1914.
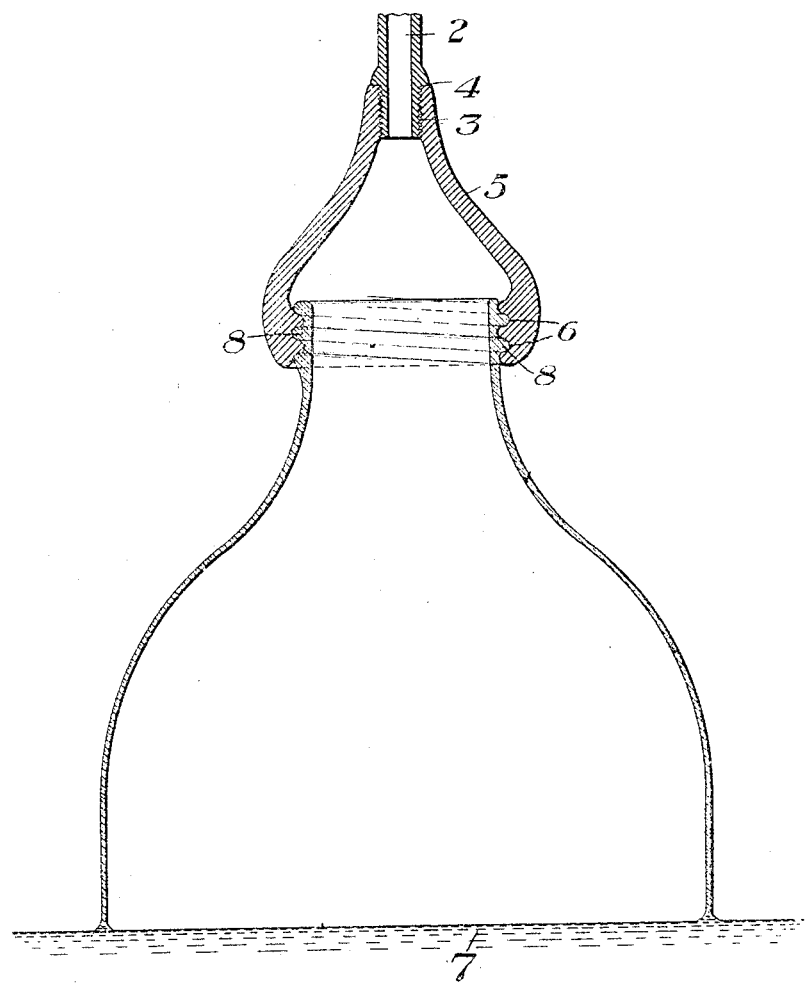
WITNESSES
INVENTOR

UNITED STATES PATENT OFFICE.

OLIVER E. MAYNARD, OF ARNOLD, PENNSYLVANIA, ASSIGNOR TO WINDOW GLASS MACHINE COMPANY, OF PITTSBURGH, PENNSYLVANIA, A CORPORATION OF NEW JERSEY.

DRAWING GLASS.

1,120,512.

Specification of Letters Patent. Patented Dec. 8, 1914.

Application filed December 29, 1911. Serial No. 668,539.

*To all whom it may concern:*

Be it known that I, OLIVER E. MAYNARD, of Arnold, Westmoreland county, Pennsylvania, have invented a new and useful Improvement in Drawing Glass, of which the following is a full, clear, and exact description, reference being had to the accompanying drawing, forming part of this specification, in which the figure is a vertical section illustrating my invention.

My invention relates to the drawing of hollow glass articles from a bath of molten glass, and is designed to provide an improved form of blow pipe or bait; and also the manipulation of the same in a manner to cause the bait when dipped into a bath of molten glass to chill a portion of the glass and form a helical or thread-like anchorage connection between the glass and the bait, which, after the completion of the drawing operation, can be readily separated from the bait by an unscrewing movement.

Referring to the accompanying drawings, the numeral 2 designates the stem of a blow-pipe, which is shown as having a threaded lower portion 3 below a shoulder 4.

5 is the lower or bait-forming portion of the blow-pipe, which is of bell shape, and which is internally threaded at its upper portion to screw onto the threaded portion 3 of the blow pipe stem. The hollow bell-shaped portion 5 is preferably thickened somewhat at its lower portion, and is formed with an internal helical groove or thread 6.

In the operation of drawing hollow glass articles, such as glass cylinders, the bell-shaped portion 5 is lowered in a cold condition into a bath 7 of molten glass. A portion of the molten glass will enter the lower portion of the bait, and will be chilled by the cold metal thereof so as to form anchorage threads 8. Owing to the chilling of these anchorage threads, they will not adhere to the metal of the bait. During the time that these anchorage threads are being formed, some air pressure is preferably admitted to the interior of the bait through the blow-pipe stem so that the anchorage portion of the glass will be of hollow form. This air also assists in chilling the glass, which forms the anchorage portion. The air pressure must, of course, be low enough to allow the glass to enter the hollow bait. The bait is held in this position a sufficient length of time to form the chill, but the drawing operation is commenced before the bait has become heated to a temperature at which the glass will adhere to it either interiorly or exteriorly. After the formation of this anchorage portion, the glass article is drawn in the usual manner. After the drawing operation has been completed, the anchorage and cap portions of the article can be readily removed from the bait by a relative unscrewing movement. In practice, it is found that there will be no adhesion whatever between the glass and the bait, and that when the anchorage portion of the glass is removed from the bait it shows perfectly formed smooth-surfaced threads.

By my improvement, I not only obtain a highly efficient anchorage connection between the bait and the glass, which is of a character to prevent the article cracking off and dropping from the bait during the drawing operation; but I also avoid the time and labor of heating the baits and subsequently cleaning them as is necessary where heated baits are employed.

Any suitable metal may be employed to form the hollow bait. In practice, I have found that a bait made of cast steel is highly satisfactory.

I do not desire to limit myself to the exact form of the bait which I have herein shown and described, since this form may vary both interiorly and exteriorly so long as the provision of the interior grooves at different levels is retained. While these grooves are preferably parts of a continuous helix, they are not necessarily so. It will be apparent that owing to the extended surface of these grooves or threads, I am able to sustain a much greater weight of glass and hence a larger cylinder, than where a single circular ledge is used.

The external form of the bait should be such as to prevent adherence of glass thereto. To this end, the exterior surface of the lower portion of the bait is convex and of decreasing diameter downward. Owing to this shape, as the bait leaves the bath of glass, the glass which has been chilled by contact with its exterior surface will fall away instead of forming a chilled ring around the outside of the bait.

What I claim is:—

1. The herein described method of forming hollow glass articles, which consists in dipping a hollow cold-metal bait having an internal helical groove into a bath of molten glass, and thereby chilling a portion of the glass and filling the groove with chilled glass to form anchorage threads of complementary form, then drawing the cylinder, and subsequently separating the chilled anchorage portion of the glass from the bait by a relative unscrewing movement; substantially as described.

2. As a new article of manufacture, a hollow bell-shaped blow-pipe or bait having an internal helical anchorage-forming groove at its drawing end; substantially as described.

3. A round bait having an axially rotatable releasable article-engaging surface.

4. A bait having at least one spiral rib at its article-engaging end for interengaging with the material of an article and permitting the direct release of the bait and article by a relative turning thereof.

5. A bait having an interior spiral thread-like article-engaging surface.

In testimony whereof, I have hereunto set my hand.

OLIVER E. MAYNARD.

Witnesses:
WM. L. MONRO,
R. H. BELLMAN.

Copies of this patent may be obtained for five cents each, by addressing the "Commissioner of Patents, Washington, D. C."